Aug. 12, 1969     KIYOO TAKEYASU ET AL     3,461,367

BRUSHLESS D-C SERVOMOTORS

Filed May 27, 1966     3 Sheets-Sheet 1

INVENTORS
KIYOO TAKEYASU
TOSHIO NUMAKURA

BY Paul M. Craig, Jr.

ATTORNEY

United States Patent Office 3,461,367
Patented Aug. 12, 1969

3,461,367
BRUSHLESS D-C SERVOMOTOR
Kiyoo Takeyasu, Hachioji-shi, and Toshio Numakura,
Kodaira-shi, Japan, assignors to Hitachi, Ltd., Tokyo,
Japan, a Japanese corporation
Filed May 27, 1966, Ser. No. 553,495
Claims priority, application Japan, May 31, 1965,
40/31,642
Int. Cl. H02k 29/02; H02p 5/06
U.S. Cl. 318—138                                   6 Claims

ABSTRACT OF THE DISCLOSURE

A control for a brushless D-C permanent magnet servomotor which includes a field coil suitably mounted for producing a varying magnetic field and a permanently magnetized rotor mounted for rotation within the magnetic field. The control comprises a rotor position detector for developing output signals indicative of the rotor position and supplying the output signals to chopper means for chopping a control input signal for controlling the magnitude and polarity of the magnetic field produced by the field coil. Transistor amplifiers are connected to the output of the chopper and comprise at least first and second transistors for amplifying the chopped positive control input signals and the chopped negative control input signals. The outputs of the first and second transistors are connected with the field coil for supplying a current to the field coil in opposite directions whereby the rotor may be rotated clockwise or counter-clockwise at a desired speed in accordance with the polarity and magnitude of the impressed control input signal.

---

This invention relates to brushless D-C servomotors of relatively simple circuit structure which can find many industrial applications in the field of instrument servo-systems.

Heretofore servomotors of A-C 2-phase type and of D-C type have widely been employed in the field of instrument servo-systems, and it has been well acknowledged in the art that the latter type of servomotor has many advantages over the former type in that the latter has a higher efficiency than the former, the latter can easily be made to have a small size and light weight, and the latter can be freely set to operate at any desired speed of rotation. In spite of these and other advantages, the servomotor of D-C type has fallen behind the A-C 2-phase servomotor in actual applications especially in the applications of small-sized servo-mechanisms owing to several inherent defects including decrease of small signal sensitivity, the short service life and troublesome maintenance resulting from the presence of the mechanical contact between the brushes and the commutator. In view, however, of the recent tendency towards more and more small-sized and light-weight instruments, the excellent adaptability of D-C servomotor to the operational requirements as described above has highly been appreciated and a demand has arisen for the development of a brushless D-C servomotor which is not provided with any mechanical contact point, which has been the greatest defect of the prior D-C servomotors.

It is therefore the primary object of the present invention to provide a brushless D-C servomotor which has no mechanical contact point therein and retains the excellent advantages inherent in D-C servomotors as described above.

Figure 1:
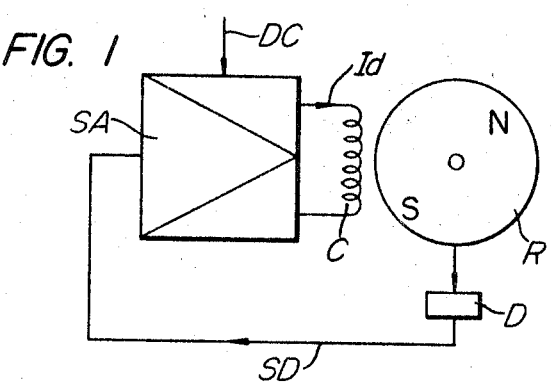
Figure 2:
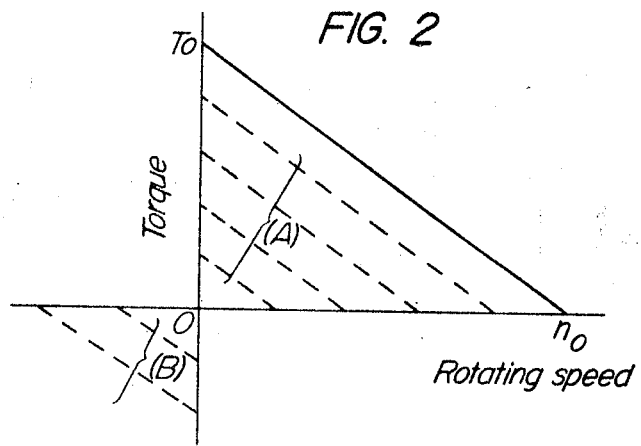
Figure 3:
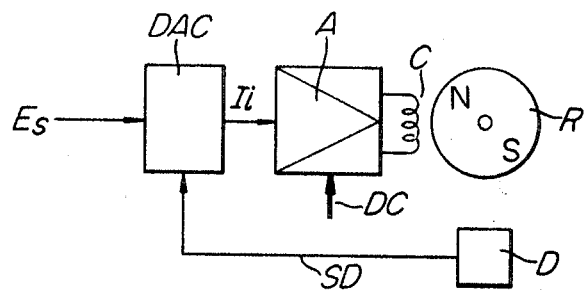
Figure 6:
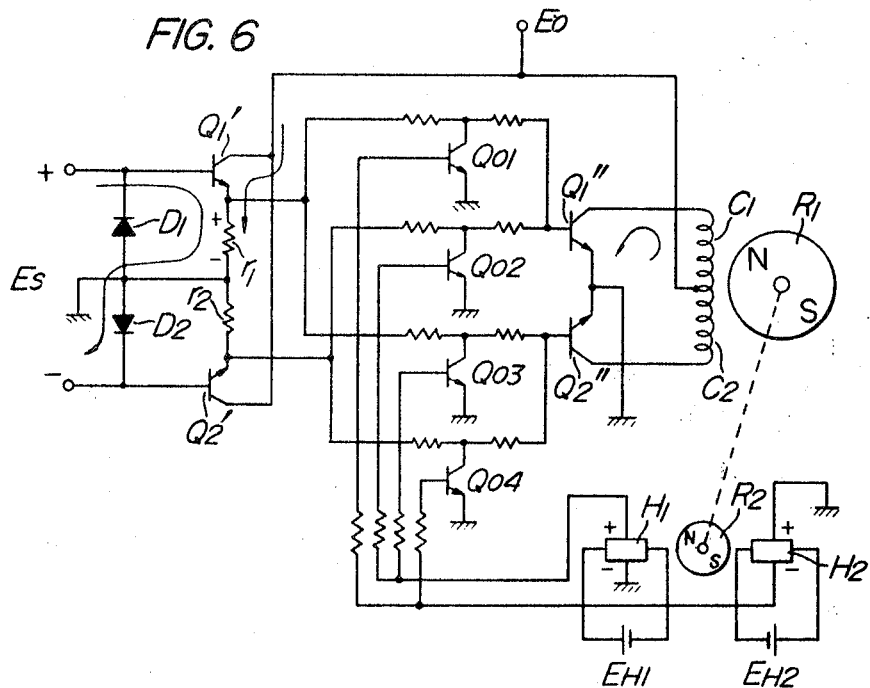

The above and other objects, advantages and features of the present invention will become apparent from the following description with reference to the accompanying drawings, in which:

FIG. 1 is a diagrammatic view for the illustration of the principle of operation of a prior brushless D-C motor;
FIG. 2 is a graphic illustration of the torque-speed characteristics of the brushless D-C motor of FIG. 1;
FIG. 3 is a diagrammatic view for the illustration of the principle of operation of the brushless D-C servomotor according to the invention; and
FIGS. 4 to 6 are schematic circuit diagrams of a few embodiments according to the invention.

Before giving detailed description of the present invention, the principle of operation and the torque-speed characteristics of a prior brushless D-C motor will first be described so that the present invention can more clearly be understood. The brushless D-C motor shown in FIG. 1 includes a detector D in the form of a search coil, a Hall effect or magneto resistive effect device, a photoelectric device or the like which detects the rotor position of a magnet rotor R. A switching amplifier SA is provided so as to be energized from a D-C power supply DC and is operative in response to a detected signal SD from the rotor position detector D to effect switching in such a way that the power from the D-C power supply DC can be converted to an armature current $Id$ whose magnitude and polarity are in exact synchronism with the position of the magnet rotor R. As is well known in the art, an armature winding C is operative upon receiving the above armature current $Id$ to develop a torque T in a predetermined direction. It is also commonly known that the prior brushless D-C motor shows the torque-speed characteristics as shown by a solid curve in FIG. 2 and this characteristic curve appears as a substantially straight line connecting between the starting torque $To$ and the no-load speed $N_0$. It is apparent that the torque-speed characteristics of the brushless D-C motor will change in a manner as shown by a dotted curve group A when the armature voltage for supply thereto is successively varied, and the torque-speed characteristics as shown by dotted curve group B will be obtained when the polarity of the armature voltage is reversed. It is therefore obvious that the above brushless D-C motor can operate as a servomotor if an arrangement may be made so that the magnitude and polarity of voltage to be supplied to the armature windings of the brushless D-C motor are controlled depending on the magnitude and polarity of a given external control signal and this supply voltage is made to synchronize with the position of the magnet rotor. An important feature of the present invention resides in the provision in the brushless D-C motor of a DC-AC converter which is adapted to be actuated by the signal SD from the rotor position detector D so that this converter converts the above external control signal to an A-C signal which is in synchronism with the rotor position and so that the brushless D-C motor can operate in the manner as described above. It is thus possible to obtain a brushless D-C servomotor having the desired function.

FIG. 3 is a block diagram for the illustration of the principle of operation of the brushless D-C servomotor according to the invention, in which an arrangement is made so that a control signal $Es$ made on and off by a detected signal SD from a rotor position detector D of the structure as described previously is amplified in an amplifier A for supply to an armature winding C. More precisely, the control signal $Es$ is converted to an A-C signal by a DC-AC converter DAC such as a transistor chopper, diode chopper or mechanical chopper but since this DC-AC converter DAC is adapted to be excited by the detected signal SD from the above-described rotor position detector D, the output $Ii$ of the DC-AC converter DAC takes the form of a signal which is synchronized with the angular position of magnet rotor R. Further, by designing the amplifier A in a manner that it has a linear characteristic, the magnitude of armature current supplied to the armature winding C can be proportioned to the magnitude of the input signal and the polarity of the armature current can also be made to vary with relation to the polarity of the input signal. It is thus possible to obtain a brushless D-C servomotor with the desired function by arranging these elements in the manner as described above.

Figure 4:
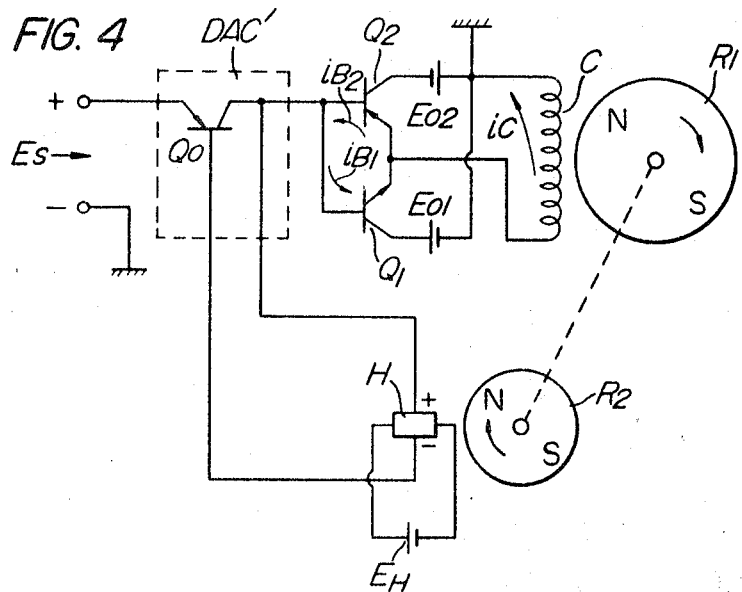
Figure 5:
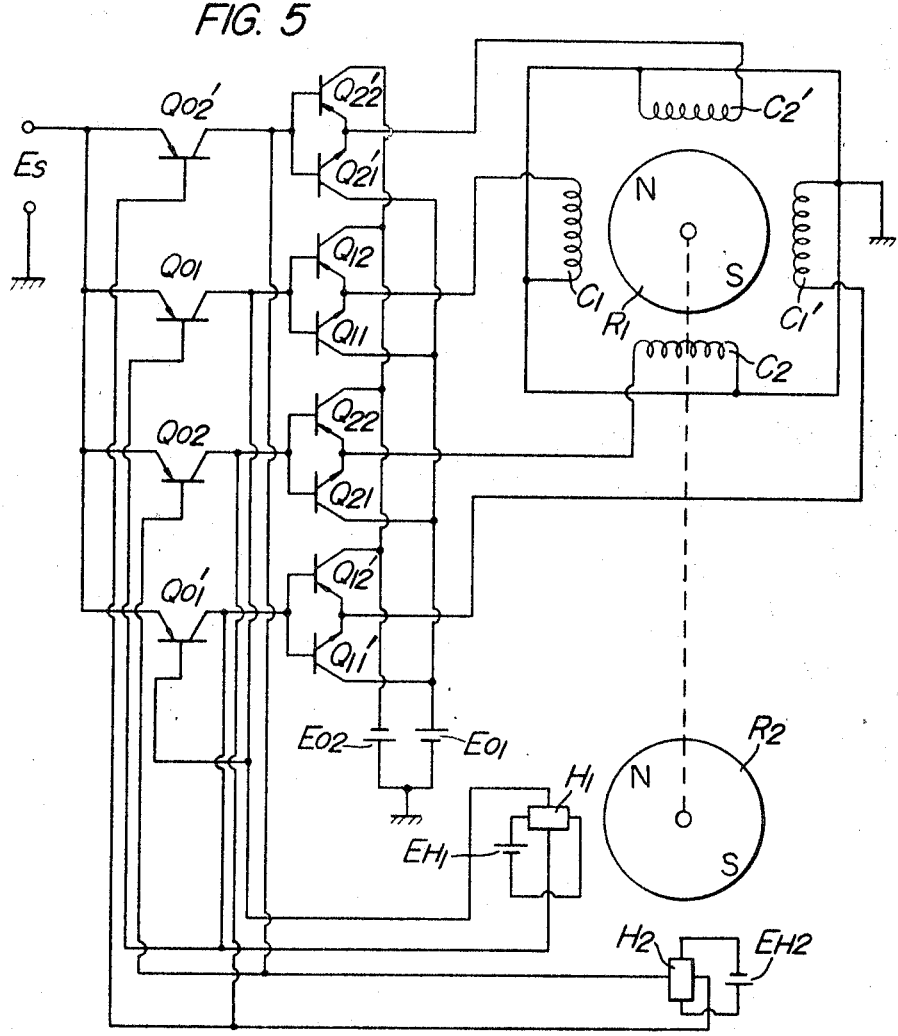

FIG. 4 is a schematic circuit diagram of an embodiment according to the present invention representing a case in which a Hall effect device H is employed to work as the rotor position detector D as shown in FIG. 3. The brushless D-C servomotor of FIG. 4 includes a magnet rotor $R_1$ of permanent magnet or like material, which is disposed to cooperate with an armature winding C, and a rotor $R_2$ which is disposed to cooperate with the Hall effect device H and is interengaged with the rotor $R_1$ for interlocked operation therewith. In this embodiment, the direction of the magnetic flux passing through the Hall effect device H is reversed in one complete revolution of the rotor $R_2$ so that the polarity of output from the Hall effect device H can also be reversed.

A DC-AC converter DAC′ such as a transistor $Q_0$ is provided to effect DC-AC conversion of an external control signal $Es$ in response to a detected signal supplied from the Hall effect device H, and amplifiers such as transistors $Q_1$ and $Q_2$ are arranged to be energized from the respective D-C power supplies $E_{01}$ and $E_{02}$ so as to amplify the output signal from the DC-AC converter DAC′.

Suppose now that the external control signal $Es$, having a polarity as shown, is supplied to the brushless D-C servomotor having the structure as described above. When, under this situation, the Hall effect device H is opposed by the N pole of the rotor $R_2$ and the magnetic flux passes through the Hall effect device H in a certain direction, that is, the output from the Hall effect device H has a polarity as shown, the transistor $Q_0$ is driven to its "on" state and therefore the DC-AC converter DAC′ is driven to its short-circuited state. As a result, base current $i_{B1}$ is supplied from the external control signal $Es$ to the base of transistor $Q_1$ and the transistor $Q_1$ conducts to allow for the flow of armature current $i_c$ through the armature winding C in the direction as shown by arrow. This armature current $i_c$ urges the permanent magnet rotor $R_1$ to rotate, for example, in the direction shown by arrow.

In case the Hall effect device H is now opposed by the S pole of the rotor $R_2$ and the output from the Hall effect device H has a polarity opposite to that shown in FIG. 4, the transistor $Q_0$ is in its "off" state and the DC-AC converter DAC′ is in its open-circuited state. Therefore, the base current $i_{B1}$ having flowed into the base of transistor $Q_1$ ceases to flow to urge the transistor $Q_1$ to its "off" state, with the result that no armature current is supplied to the armature winding C during this period and the rotor $R_1$ continues to rotate by the force of inertia until the rotor $R_2$ again takes the position in which the magnetic flux from the N pole passes through the Hall effect device H. In such position of the rotor $R_2$, the DC-AC converter DAC′ is again short-circuited to supply the armature current to the armature winding C.

It will be understood that similar operation is successively repeated and the rotor $R_1$ keeps rotating in a predetermined direction. In this case it will be known that the magnitude of the base current $i_{B1}$ varies with relation to the magnitude of the external control signal $Es$, and hence the magnitude of the armature current $i_c$, that is, the magnitude of torque varies with relation to the magnitude of the external control signal $Es$. In case the polarity of the external control signal $Es$ is reversed from that shown in FIG. 4, conduction and non-conduction of the transistor $Q_0$ by the Hall effect device H causes the transistor $Q_2$ to operate in a manner similar to that described above so that the armature current $i_c$ of magnitude corresponding to the magnitude of the external control signal $Es$ is supplied to the armature winding C in a direction opposite to that shown by arrow and the rotor $R_1$ is caused to rotate by the torque in a direction opposite to that shown by arrow.

It will be understood that, by the arrangement as described above, the magnitude and direction of the armature current $i_c$, hence, the torque, can suitably be varied depending on the interrelation between the external control signal $Es$ and the contact-less rotor position detector H and it is thus possible to realize a brushless D-C servomotor.

The embodiment described with reference to FIG. 4 includes a single rotor position detector and in this respect it may have some operating difficulties in that a relatively large degree of torque fluctuation may be unavoidable and torque may not be developed at a certain position of the rotor. However it will be understood that these difficulties can easily be solved and the servomotor can be made self-starting by employing an increased number of rotor position detectors, amplifiers, armature windings and other elements.

A preferred embodiment of this type of servomotor may have a structure as shown in FIG. 5, in which four circuits each having the configuration as shown in FIG. 4 are assembled to form a circuitry for cooperation with two Hall effect devices. In FIG. 5, a transistor DC-AC converter $Q_{01}$ is operative in a manner entirely similar to the transistor converter $Q_0$ in FIG. 4, while a transistor DC-AC converter $Q_{01}'$ is arranged to be short-circuited and open-circuited in exactly opposite relation with respect to those operations of the converter $Q_{01}$. Further, transistor DC-AC converters $Q_{02}$ and $Q_{02}'$ are arranged to operate in a manner entirely similar to the relative operations of the converters $Q_{01}$ and $Q_{01}'$ but with a 90° phase difference with respect to the latter. The transistor DC-AC converter $Q_{01}$ is connected through transistor amplifiers $Q_{11}$ and $Q_{12}$. With an armature winding $C_1$ and the interrelation therebetween is entirely similar to that between the converter $Q_0$ and the armature winding C in FIG. 4. The transistor DC-AC converter $Q_{01}'$ of opposite polarity with respect to the transistor DC-AC converter $Q_1$ is connected with an armataure winding $C_1'$ having a 180° phase difference from the armature winding $C_1$ and the interrelation therebetween is entirely similar to that between the converter $Q_{01}$ and the armature winding $C_1$. An entirely identical relation exists between the transistor DC-AC converters $Q_{02}$, $Q_{02}'$ and respective armature windings $C_2$, $C_2'$. The brushless D-C servomotor having the structure as described above has little torque fluctuation and can be self-started as will be self-evident.

The servomotor of brushless structure according to the present invention is advantageous in that it completely eliminates the prior problem of troublesome maintenance which has been unavoidable with conventional servomotors equipped with brushes and in that it has a far longer service life. Another advantage derivable from the invention is that the external control signal can be transmitted to the amplifier section without any attenuation because the voltage drop of the DC-AC converter such as transistor chopper is negligibly small. This means that the gain requested for the amplifier can be made correspondingly less and the amplifier circuit can thereby be much simplified. It is a highly noteworthy fact that the amplifier in the servomotor of the invention not only acts to turn on or off the path of armature current in response to the output signal from the detector means but also serves as a servo-amplifier. This is especially advantageous since, in a servo-system employing an A-C 2-phase servomotor on a D-C servomotor, a servo-amplifier is necessarily required for the amplification of a very small D-C input signal to such a degree that it can satisfactorily drive the servomotor. Therefore the fact that the driving chopper for the brushless D-C servomotor of the present invention can also serve as a servo-amplifier leads to a remarkably simplified structure of the servo-mechanism compared with the complex structure involved in the prior servo-mechanisms, and these advantages altogether make remarkable contributions to small-sized servo-mechanisms.

The foregoing description has referred to a case in which a Hall effect device is used as means for detecting the position of the magnet rotor in the brushless D-C servomotor, but it will be understood that the invention is in no way limited to such specific embodiment and other rotor position detecting means, for example, photosensitive elements such as photocells or phototransistors, magneto resistive elements, or magnetic—or electro-magnetic—sensitive elements such as saturable transformers or search coils may be employed to constitute the detector in the brushless D-C servomotor as described above.

Still another embodiment according to the invention is illustrated in FIG. 6, in which reference numerals $D_1$ and $D_2$ designate diodes; $Q_1'$, $Q_1''$, $Q_2'$ and $Q_2''$, transistor amplifiers; and $Q_{01}$, $Q_{02}$, $Q_{03}$ and $Q_{04}$, transistor choppers.

Suppose now that a control input $Es$ having a polarity as shown is applied, then the transistor $Q_1'$ is driven to its "on" state and the transistor $Q_2'$ is driven to its "off" state. Suppose then that voltages of polarities as shown are developed in Hall effect devices $H_1$ and $H_2$ at a certain angular position of of a magnet rotor $R_1$, then the transistors $Q_{02}$ and $Q_{03}$ are driven to their "on" state and the transistors $Q_{01}$ and $Q_{04}$ are driven to their "off" state. Therefore, the voltage developed across a resistor $r_1$ is applied across the transistor $Q_{01}$ to the base of transistor $Q_1''$ to drive the same to its "on" state and to cause flow of current through an armature winding $C_1$ in the direction shown by the arrow. This current flow through the winding $C_1$ causes the rotor $R_1$ to rotate through a half revolution so that voltages of polarities opposite to those shown are now developed across the Hall effect devices $H_1$ and $H_2$ and the transistors $Q_{01}$ and $Q_{04}$ are now driven to their "on" state while the transistors $Q_{02}$ and $Q_{03}$ are driven to their "off" state. This causes the voltage developed across the resistor $r_1$ to be applied to the base of transistor $Q_2''$ across the transistor $Q_{03}$ to drive the transistor $Q_2''$ to its "on" state. With the transistor $Q_2''$ now driven to its "on" state, current flows across an armature winding $C_2$ and the rotor $R_1$ maintains its continuous rotation. In case the control input $Es$ is supplied at a polarity opposite to that shown in FIG. 6, the transistor $Q_1'$ is driven to its "off" state and the transistor $Q_2'$ is driven to its "on" state so that the rotor $R_1$ rotates in a direction opposite to that described above. It will therefore be known that the direction of rotation of this motor varies depending on the positive or negative polarity of the control input $Es$ and the armature current is controlled depending on the magnitude of the control input $Es$. Due to the above operational characteristics, this motor can be used as a servomotor employable in general servo-systems.

What is claimed is:

1. A control for a brushless D-C permanent magnet servo-motor including:
  a field coil suitably mounted for generating a varying magnetic field in a selected area, and
  a permanently magnetized rotor suitably mounted for rotation within said magnetic field; said control comprising:
    detecting means for detecting the position of said rotor;
    control input signal means for supplying a control input signal for controlling the magnitude and polarity of the magnetic field produced by said field coil;
    chopper means for chopping said control input signal, said chopper means being coupled to and controlled by the output signal from said detecting means;
    amplifier means supplied with the chopped control input signal from said chopper means and comprising first transistor means for amplifying chopped positive control input signals and second transistor means for amplifying chopped negative control input signals; and
    said first and second transistor means being connected with said field coil so that current flowing through the field coil is supplied thereto selectively in opposite directions from said first and second transistor means, respectively, whereby said motor may be rotated clockwise or counter-clockwise at a desired speed in accordance with the polarity and magnitude of said impressed control input signal.

2. A control for a brushless D-C permanent magnet servo-motor including:
  a field coil suitably mounted for generating a varying magnetic field in a selected area, and
  a permanently magnetized rotor suitably mounted for rotation within said magnetic field; said control comprising:
    first and second detecting means for generating output signals representative of the rotor position;
    positive and negative control input signal means for supplying positive and negative control input signals, respectively, for controlling the magnitude and polarity of the magnetic field produced by said field coil;
    first and second chopper means for chopping the positive and negative control input signals, the first and second chopper means being coupled to and controlled by the output signals of said first and second detecting means, respectively;
    first and second transistor means connected with said first and second chopper means in such a manner that the first transistor means amplifies the chopped positive output signals of said first chopper means controlled by the first detecting means, and the chopped positive output signals of said second chopper means controlled by the second detecting means, and the second transistor means amplifies the chopped negative output signals of said first chopper means controlled by the first detecting means and the chopped negative output signals of said second chopper means controlled by the second detecting means;
    and said first and second transistor means being connected with said field coil so that a current flowing through the field coil is supplied thereto selectively in opposite directions from said first and second transistor means respectively, whereby said rotor may be rotated clockwise or counter-clockwise at a desired speed in accordance with the polarity and magnitude of said impressed control input signal.

3. A brushless D-C permanent magnet servo-motor control according to claim 2 wherein the first and second detecting means are disposed apart ninety degrees with respect to the rotation of the rotor and there are at least first and second field coils located at ninety degrees with respect to each other, the first and second transistor means supplied from the output of the first chopper means controlled by the first detecting means supplying the first field coil, and the first and second transistor means supplied from the second chopper means controlled by the second detecting means supplying the second field coil.

4. A brushless D-C permanent magnet servo-motor control acording to claim 3 wherein there are first, second, third and fourth field coils with the third field coil being disposed 180 degrees with respect to the first field coil and the fourth field coil being disposed 180 degrees with respect to the second field coil, said first and second detecting means deriving two output signals 180 degrees apart, said first and second chopper means each comprising two choppers operated 180 degrees apart and controlled by respective ones of the two outputs produced by each of the first and second detecting means, respectively, with first and second transistor means being coupled to the output of each chopper for supplying reversible polarity controlled magnitude current to the field coil connected therewith, and with each field coil being phase displaced 90 degrees with respect to adjacent field coils.

5. A control for a brushless D-C permanent magnet servo-motor including:
- a field coil suitably mounted for generating a magnetic field in a selected area, and
- a permanently magnetized rotor suitably mounted for rotation within said magnetic field; said control comprising:
    - first and second detecting means for developing opposite polarity signals representative of the rotor position;
    - positive and negative control input signal means for supplying positive and negative control input signals, respectively, for controlling the magnitude and polarity of the magnetic field produced by said field coil;
    - first and second chopper means for chopping the positive and negative polarity control input signals respectively, said chopper means being controlled by the output signals from both said first and second detecting means;
    - first and second transistor means each connected with both said chopper means in such a manner that the first transistor means amplifies the chopped positive polarity output signals of said first and second chopper means with the first chopper means being controlled by the first detecting means and said second chopper means being controlled by the second detecting means, and the second transistor means amplifies the chopped negative polartiy output signals of said first and second chopper means with the first chopper means being controlled by the first detecting means and said second chopper means being controlled by the second detecting means, said first and second transistor means being connected to opposite ends of said field coil so that a current flowing through the field coil is supplied thereto selectively in opposite directions from said first and second transistor means, respectively, whereby said rotor may be rotated clockwise or counter-clockwise at a speed in accordance with the polarity and magnitude of said impressed control input signal.

6. A control for a brushless D-C permanent magnet servo-motor including:
- a stator having at least a field winding, and
- a rotor with at least a pair of N–S poles which is rotatably supported within the magnetic field generated by said field winding; said control comprising:
    - detecting means for detecting the rotational position of said poles and to provide an output signal representative of the rotational position of the rotor;
    - on-off chopper means which is on-off controlled by output of said detecting means;
    - means including an input control signal source which is variable in accordance with the desired rotation of the servo-motor;
    - means for supplying to said chopper means the input control signal; and
    - amplying means coupled between the output of said chopper means and said field winding for amplifying the chopped input control signal supplied from said chopper means and for supplying the amplified chopped input control signal to said field winding with a polarity and magnitude so as to rotate the rotor in a direction and at a speed determined by the input control signal.

References Cited
UNITED STATES PATENTS

| | | | |
|---|---|---|---|
| 3,091,728 | 5/1963 | Hogan et al. | 318—138 |
| 3,165,685 | 1/1965 | Manteuffel. | |
| 3,210,631 | 10/1965 | Niccolls. | |
| 3,214,663 | 10/1965 | Kreutzer. | |
| 3,274,471 | 9/1966 | Moczala | 318—138 |
| 3,317,803 | 5/1967 | Ikegami | 318—138 |
| 3,346,792 | 10/1967 | Noumi | 318—138 |
| 3,368,128 | 2/1968 | Parrish | 318—138 |

ORIS L. RADER, Primary Examiner

G. R. SIMMONS, Assistant Examiner

U.S. Cl. X.R.

318—254, 310, 330, 345